3,066,035
PAPER COATING COMPOSITION
Charles G. Albert, Basking Ridge, N.J., assignor to Minerals & Chemicals Philipp Corporation, a corporation of Maryland
No Drawing. Filed Aug. 17, 1959, Ser. No. 833,945
11 Claims. (Cl. 106—211)

The subject invention relates to the art of coating paper stock with kaolin clay to improve the finish and printability of the stock and relates, more particularly, to an improved paper coating composition. The paper coating composition of the present invention is designed to form on the base stock a smooth level uniform surface which is visually free from mottling or roughness and which has superior gloss and ability to register accurately printed images as compared with kaolin coating colors prepared in accordance with the teachings of the prior art.

Kaolin clay is the principal pigment conventionally used to coat paper stock. The clay is applied in the form of an aqueous paste (called a "coating color") which comprises, in addition to the clay, an adhesive (usually amylaceous or casein) to bind the clay particles to the base sheet. Other pigments such as calcium carbonate and titania may be used in conjunction with the clay. Also, special purpose additives such as waxes and soaps may be used. Two of the principal factors influencing smoothness and printing characteristics of the coated sheet are: the rheological properties of the coating color, which effect the smoothing of the coating color when it is applied to the base stock; and the orientation of pigment particles on the paper substrate to form a more or less continuous pigment surface on the paper.

It is a principal object of my invention to provide a coating composition containing kaolin clay, which composition is of a character such that paper coated therewith has improved gloss and printing characteristics and the coating color has viscosity characteristics such that it has improved leveling properties when coated on base stock, as by roll coating machines.

A more specific object of my invention is the provision of a kaolin clay formulated with an amylaceous adhesive and containing a novel additive which results in a coating color which effects a substantial improvement over prior art coating compositions employing the same clay in terms of gloss and printing qualities of the coated sheet.

A further object of my invention is to provide coated lightweight publication grade paper having outstanding gloss and capable of accurately registering halftone printed images.

Other objects and advantages will be apparent to those skilled in the art.

I have discovered a simple inexpensive method by means of which the leveling properties, gloss and printing properties of clay coated stock may be materially improved.

Briefly stated, the present invention contemplates the addition of a small quantity of certain alkylene or polyalkylene polyamine soaps, hereafter set forth, to an otherwise conventional kaolin clay coating color. Although coating color compositions of my invention contain as essential ingredients: water, kaolin clay, an adhesive for said clay, particularly an amylaceous adhesive, and a fatty acid salt of an alkylene polyamine, it will be distinctly understood that other materials commonly used in aqueous coating colors are included within the scope of the coating color compositions as described and claimed herein.

I have found that a kaolin coating color formulated with the alkylene polyamine soap results in a coated sheet having printing qualities, namely clarity of printing, absence of mottling and continuity of ink surface superior to the same stock coated with a like coating color formulated with the same kaolin clay with no polyamine soap additive. Moreover, the coating color formulated with polyamine soap has a higher viscosity at a given solids concentration and is more thixotropic than the coating color in which the amine soap is excluded. As a result of this, the coating color formulated with polyamine soap has better leveling properties. The higher gloss of a sheet coated with the coating color of the present invention permits the coated sheet to be calendered less severely than would normally be possible, with the result that an improvement in the quality of the coated paper may be realized.

I have found that polyamine soap additive is superior to an unneutralized alkylene polyamine additive (or polyamine neutralized with a relatively strong acid, such as acetic acid) in several important respects. One important advantage is that the polyamine soap has a lower vapor pressure than the free polyamine counterpart and possible loss of polyamine additive in formulation of the coating color or in the paper operation will be minimized or obviated through use of the soap. Moreover, I have found that the polyamine soap increases the gloss of a coated sheet to an extent not realized using an equivalent (in terms of amine content) quantity of free polyamine, as will be shown hereafter.

I do not wish to be bound to any theory for the unusual and surprising results that I realize by the inclusion of the polyamine soap in the coating color. Microscopic studies indicate that the polyamine influences favorably the orientation of the kaolin pigment in the coated film in a manner such that the kaolin platelets tend to bridge crevices in the fibrous substrate rather than follow the contour of the crevice. The result of such orientation would be expected to be a finish on the coated stock which is smoother and thus permits more accurate registration of printed images. I note also that the rheology of the coating composition is changed by the presence of the polyamine soap in that the system exhibits a more marked thixotropy than the coating color in the absence of the polyamine soap and the coating color is more heavily bodied at a given solids concentration than would be the case if the polyamine were absent. The latter would account for the improved leveling properties of the coating color formulated with the polyamine soap.

Paper stock coated with kaolin coating colors formulated with polyamine soap has less show-through of printing ink on the reverse side of the coated sheet than a conventional coating color although the sheet tends to pick up more ink. A possible explanation for this phenomenon is that the polyamine soap may form a coating on clay particles present on the surface of the sheet with the result that the organic components of the soap will facilitate and improve wetting of the normally hydrophilic pigment by the organic printing ink vehicle.

It is interesting that the outstanding results I achieve through the use of the alkylene polyamine soaps in the coating color are not realized by the use of lower aliphatic amines as a class and the presence of at least two strongly basic groups in the amine used in preparing the soap additive is apparently necessary. For example, soaps of monobasic amines, even those which are strongly basic, such as diethylamine, or alkanolamines, such as diethanolamine, are outside the scope of my invention.

An instance in which the improved coating color of the present invention is particularly useful and wherein outstanding economic advantages are realized is in the production of lightweight quality magazine stock adapted for printing with heat-set ink by halftone printing techniques. Recently the publication industry has accepted coated stock of a lower weight than formerly used in order to cope with increased charges for mailing publications. In preparing such coated stock, lighter coat weights are employed than have been used in preparing heavier coated stock. To realize equivalent printing characteristics utilizing a lower weight coated stock, either the base stock or coating color must be improved. It is impossible for many paper coaters to improve the base stock, the quality of which is controlled to a large extent by the character of the fiber. Thus an improvement in the coating color must be accomplished to provide equal printing characteristics in lighter weight coated stock.

Although one instance of the utility and advantage of the novel coating composition of my invention has been set forth above, it will be obvious that improving the coating clay of any coated sheet using domestic or imported kaolin is a valuable and important contribution to the art.

My invention is not limited to any procedure for preparing the improved kaolin clay coating color including alkylene polyamine soap since a variety of methods are suitable. Preferably the polyamine soap is incorporated into the otherwise finished coating color in the form of a dilute aqueous dispersion or solution. For example, I have obtained excellent results by slurrying clay in the water using a deflocculating agent such as sodium silicate or tetrasodium pyrophosphate unless the clay has been pretreated with an appropriate deflocculant, adding a suitable adhesive solution in the conventional manner, and then uniformly incorporating a dilute aqueous solution of the polyamine soap into the mixture. The coating stock is applied to the base stock in the usual manner and then dried and calendered in accordance with methods well known to those skilled in the art. If desired the procedure may be varied.

The alkylene polyamine and polyalkylene polyamine soaps I employ in accordance with the present invention are the higher fatty acid ($C_{12}$–$C_{18}$ fatty acids) salts of alkylene polyamines or polyalkylene polyamines, said alkylene polyamines having the general formula:

$$\underset{\underset{R_4}{|}}{\overset{\overset{R_3}{|}}{N}}(R_1NH)_nR_2NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms, and $n$ is an integer from 0 to 8.

Because of their commercial availability, I prefer to use the lower members of the nonalkylated ethylene amine series, i.e. ethylene amines, having two primary amine groups and $n$ secondary amine groups. In the lower ethylene amine series, $R_1$ and $R_2$ in the above formula are ethylene groups and $n$ is an integer from 0 to 3. Thus the preferred nonalkylated ethylene amines have the general formula:

$$NH_2(CH_2CH_2NH)_nCH_2CH_2NH_2$$

wherein $n$ is an integer from 0 to 3. Species encompassed within the group of preferred ethylene amines, listed in order of ascending value of $n$ are: ethylenediamine ($n=0$), diethylene triamine, triethylenetetramine and tetraethylene pentamine ($n=3$). Pentaethylene hexamine ($n=4$), heptaethylene octamine ($n=6$) and nonaethylene decamine ($n=8$) are not presently available commercially but should be as satisfactory as the lower ethylene amines cited above.

As examples of other alkylene polyamines within the compass of the general formula of alkylene polyamines and polyalkylene polyamines set forth above are propylene diamine and other propylene amines, mixed trimethylene-ethylene amines such as $$NH_2(CH_2)_2NH(CH_2)_2NH(CH_2)NH_2$$

as well as lower alkyl derivatives of any of the aforementioned alkylene polyamines such as, for example, N,N-dimethylamino-propylamine and N,N-diethylamino-propylamine. Each of the aforementioned aliphatic polyamines contains at least two highly basic amine groups. It will be noted that hexamethylene tetramine, despite its name, is not accurately called an alkylene polyamine. Hexamethylene tetramine functions as a weak monobase, unlike the polyamines above set forth, and is not useful in forming the soaps employed in the practice of the present invention.

Species of acids useful in forming the aforementioned alkylene polyamine soaps are aliphatic higher fatty acids having from 12 to 18 carbon atoms and may be saturated or unsaturated. As examples of suitable acids may be cited lauric acid, myristic acid, palmitic acid, stearic acid and oleic acid, linoleic acid. It will be understood that my invention is not restricted to the use of the pure acids but includes the use of such other materials as are normally present with these acids, as well as acid mixtures as are obtained from tallow, soy bean oil, coconut oil and the like.

The polyamine soaps are prepared by means well known to those skilled in the art. The reaction is one of salt formation with care being exercised to prevent amidification or formation of imidazolines. Various relative proportions of acid and polyamine may be present in the polyamine soaps I employ; in other words, some or all of the amine groups of the polyamine may be reacted with the acid. Thus mono-, di-, tri-, etc., fatty acid salts of the aforementioned alkylene polyamines may be used.

I have found that particularly good results are realized when the alkylene polyamine soap is one formed by saponifying a fatty acid with a polyalkylene polyamine which has at least three amine groups and the quantity of acid employed is limited so that at least two amine groups of the polyalkylene polyamine are unneutralized. Thus, a preferred class of polyamine soaps may be represented by the following probable formula:

$$(ACO_2H)_{n_2} \cdot R_3R_4N(R_1NH)_{n_1}R_2NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms, A is selected from the group consisting of alkyl and alkenyl groups having from 11 to 17 carbon atoms, $n_1$ is an integer from 1 to 8 and $n_2$ is a number (an integer or fraction) from 1 to $n_1$. It may be readily seen that when $n_1$ equals $n_2$ in the formula given above, the resultant amine soap will contain two unneutralized amine groups. When $n_2$ is less than $n_1$ (but at least 1) e.g., when $n_1=3$ and $n_2=2$, the resultant amine soap will contain more than two unneutralized amine groups.

From the standpoint of availability and cost, I prefer to employ diethylene triamine soaps, particularly diethylenetriamine monostearate.

The kaolin clay I employ is a paper coating grade which ordinarily is a white, very finely divided, grit-free material. Good results have been realized using a clay having a particle size distribution such that at least about 70 percent, and preferably about 80–90 percent, by weight of the particles thereof have the water sedimentation characteristics of particles 2 microns or finer.

For economic reasons I prefer to employ a domestic kaolin clay, such as one mined in Georgia, Florida or Texas, and which has been degritted and fractionated, as by hydraulic classification, to a particle size range set forth above. The clay may be bleached by methods well known to those skilled in the art or may be otherwise processed to improve specific properties such as brightness. English kaolin, which is chemically similar to domestic kaolin (although the titania and iron content of the former is less whereby the native brightness is greater) should also be useful in the practice of my invention. English kaolin has a higher content of illitic impurity and has a higher surface area than Georgia kaolin of similar particle size distribution.

The amount of polyamine soap I employ is small, being only a small fraction of the weight of the clay. The exact range of suitable quantities and optimum quantity of polyamine soap additive for any specific coating color formulation will vary with the character of the clay, particularly the surface area of the clay, and with the molecular weight of the alkylene polyamine component of the soap, and is readily determined experimentally by observation of the characteristics of a sheet coated with the formulation. Typically, the polyamine soap will be used in an amount such that the polyamine component of the soap is present in amount within the range of about 0.025 to about 5.0 percent and, more usually, 0.10 to 1.0 percent, based on the dry weight of the clay.

I may use kaolin clay as the sole pigment, mixing various grades for economic reasons or to achieve desired gloss characteristics. However, I may add other pigments when special surface effects are required of the coated stock. For example, I may add whiting to the kaolin, typically in an amount of about 15 percent, based on the total pigment weight. Other pigments I may use in combination with the kaolin include satin white and titania.

The adhesive I employ is any water soluble or dispersible amylaceous adhesive used by the paper coating industry, such as hypochlorite oxidized starch, dextrinized starch, epoxide modified starch, enzyme converted starch, etc. If desired a mixed adhesive such as an amylaceous-synthetic latex (usually butadiene-styrene latex) or amylaceous-casein mixture may be employed. It is reasonable to expect that protein adhesives, such as casein or soyabean protein adhesives, may be used as the sole adhesive component of the coating color of the present invention.

The pH of the coating color may vary within a relatively wide range, although coating colors are most usually applied at a pH within the range of from about 7 to 10.

The clay will usually be used in amount between about 25 percent and about 65 percent, based on the total composition weight and the adhesive in amount between about 5 percent and about 30 percent by weight, same basis. The total solids content of the composition will vary considerably with the type of coating equipment to be used.

In many instances the finish of the coated sheet will be improved by inclusion in the coating color of a small amount of waxy substance or additional soap such as calcium stearate, as is well known to those skilled in the art.

The following examples are given only for the sake of illustrating certain embodiments of my invention and are not to be construed as limiting the spirit and scope thereof.

EXAMPLE I

A coating color of the present invention was formulated, using as the basic formulation (exclusive of the polyamine additive) a typical starch coating color composition used in making coated magazine stock.

Diethylene triamine monostearate soap additive was prepared as follows: 10.3 grams of diethylene triamine was dissolved in 300 ml. of distilled water. This solution was heated to 80° C. and 28.4 grams of molten stearic acid was added, representing equal molal quantities of polyamine and acid. The mixture was stirred vigorously while the stearic acid was being added. Gelation of the mixture occurred. The mixture was then placed in an oven held at 90° C. and allowed to stand for 15 minutes. It was then removed and allowed to cool, forming a heavy gel which became translucent. The aqueous gel contained 11.4 percent of a material of the probable general formula:

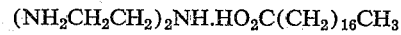

The diethylene triamine content of the gel was 3.2 percent and the stearic acid content was 8.2 percent.

A 65 percent solids clay-water slurry was prepared using a Georgia kaolin clay which had been spray dried in the presence of 0.35 percent, based on the dry weight, of tetrasodium pyrophosphate. The predispersed clay has the following characteristics: pH 6.6; particle size distribution, 92 percent finer than 5 microns, 80 percent finer than 2 microns and 60 percent finer than 0.8 micron; 0.1 percent by weight free moisture (free moisture is the weight percent of clay eliminated when the clay is heated essentially to constant weight at 250° F.). A 27 percent solids solution of precooked solubilized medium viscosity hypochlorite oxidized cornstarch was added to the clay-water slurry together with water to bring the total solids content of the slurry to about 48 percent. The weight ratio of dry clay to dry starch was 100 to 18. The starch solution was prepared by cooking the cornstarch and distilled water in a steam bath until the temperature of the starch reached 190° F., following which the solution was immediately cooled to 100° F. for use.

A fraction of the diethylene triamine stearate soap, prepared as set forth above, was added to the starch-clay slurry in amount to supply 0.10 percent by weight of diethylenetriamine, based on the weight of the clay, moisture free basis. This quantity corresponds to 0.375 percent by weight of diethylenetriamine monostearate, based on the dry clay weight.

EXAMPLE II

Following is an illustration of my invention applied to provision of improved lightweight coated magazine stock. In this example the improvement in leveling properties, gloss and printing qualities that is achieved by the polyamine soap additive to a starch coating color is demonstrated.

Various coating colors were formulated to coat 27# basic weight stock (essentially a sulfite ground wood base stock) with sufficient coating color to provide 40 lb. per ream (3300 sq. ft.) coated paper suitable for use in pictorial magazine.

The basic kaolin coating color formulation was the approximately 48 percent solids hypochlorite oxidized cornstarch formulation of Example I. A control containing no polyamine additive was prepared. Also formulated was a coating color similar to the preparation of Example I only containing unneutralized diethylene triamine in amount such that diethylenetriamine content of this test formulation was equivalent to the diethylene triamine content of a like formulation in which diethylene triamine stearate soap was used. The same kaolin clay was employed in all preparations.

All coating was done on a bench-type trailing blade coater which is described in U.S. 2,368,176 to A. R. Trist. Coat weight was kept within the range of 6.5–7.0 lbs. per side per ream.

The coated sheet was prepared and conditioned under conditions of 50 percent relative humidity (±2 percent) and at 73° F. ±2° F., TAPPI standard conditions for paper testing.

Each coated sheet, after conditioning, was calendered on a Wheeler super-calender through four nips at a pressure of 750 lbs. per linear inch (15 lbs. gauge pressure).

Gloss values were obtained with the Hunter reflectometer, using the 75° head.

Viscosity at various rates of shear was determined with a Brookfield viscometer.

The gloss values and viscosity characteristics of the coating colors are reported in Table I.

The results reported in Table I illustrate the outstanding improvement in gloss of the sheet coated with the kaolin coating color formulated with polyamine soap over the other coating colors investigated. Also shown is that the polyamine soap increases the viscosity of the coating color at the various rates of shear. This indicates that use of polyamine soap will improve the leveling properties of the coating color, particularly when a roll coater is employed.

Table I

COMPARISON OF PROPERTIES OF KAOLIN COATING COLORS PREPARED WITH AND WITHOUT POLYAMINE SOAP ADDITIVE

| Formula | Percent Solids | Diethylene Triamine, percent based on wt. of clay (moisture-free clay basis) | Properties | | |
|---|---|---|---|---|---|
| | | | Gloss | Brookfield Viscosity | |
| | | | | R.p.m. | cps. |
| Control | 48.2 | None | 22.2 | 10 | 1,680 |
| | | | | 20 | 1,080 |
| | | | | 50 | 604 |
| | | | | 100 | 440 |
| Diethylene triamine additive | 48.0 | 0.10 | 22.3 | 10 | 4,220 |
| | | | | 20 | 3,190 |
| | | | | 50 | 2,036 |
| | | | | 100 | 1,468 |
| Diethylene triamine monostearate | 48.3 | ¹ 0.10 | 27.3 | 10 | 3,280 |
| | | | | 20 | 2,260 |
| | | | | 50 | 1,369 |
| | | | | 100 | 1,144 |

¹ Equivalent to 0.357% diethylene triamine monostearate, based on wt. of clay (moisture-free clay basis).

The improvement in gloss was less pronounced when the diethylenetriamine soap content of the test coating color was reduced by 50 percent.

The inked samples were then compared for ink absorption and show-through by observing the inked surfaces of the paper as well as comparing the extent of ink visible on the reverse side of the coated sheet. An excess of heavy bodied black pigmented polybutene printing ink is applied to a small section of coated paper. As soon as possible after application, the ink is wiped off with wiping tissue and wiping is continued until no ink will come off on the wiping tissue. Samples were individually treated. One individual made all the ink tests and an effort was made to reproduce accurately the pressures involved in wiping and the time elements. The same relative area of each coated sheet was used and evaluations were made on three sheets. The reverse side of the sheet coated with the control coating color showed considerable ink show-through; the sheet coated with the composition formulated with polyamine soap had little show-through and substantially no ink pigment had penetrated through the sheet. It was readily apparent that more ink was absorbed by the sheet coated with a formulation in which the polyamine soap was omitted. These observations indicate that paper coated with the coating color containing the polyamine soap picked up equal amounts of the ink but kept more of the pigment portion of the ink on the paper surface.

EXAMPLE III

The stock coated with the kaolin coating color containing the stearate soap of diethylenetriamine in Example II was tested for printing qualities on a letter press proofpress using halftone printing plates. The press and printing procedure employed are detailed in a publication of IPI entitled "Testing Printability of Paper and Board With Ink—III" (November 1957), by Otto P. Berberich.

The printed sheet was characterized by outstanding continuity of ink surface, clarity and absence of mottling. The print showed less show-through of ink, particularly in the areas of the sheet where dark printed images were made, than a printed sheet coated with the control coating color which was formulated without the polyamine soap.

EXAMPLE IV

Other coating color formulations of my invention are tabulated below:

| Parts by weight | | | |
|---|---|---|---|
| Kaolin clay predispersed with 0.35% by wt. of tetrasodium pyrophosphate | 28% solids solution | H₂O | Polyamine soap, percent polyamine based on clay weight |
| 300 | ª150 | 257 | 0.25%, tetraethylene pentamine tetralaurate. |
| 300 | ᵇ193 | 247 | 0.30%, triethylene tetramine dioleate. |
| 300 | ᵇ172 | 288 | 0.50%, ethylene diamine distearate. |
| 300 | ᶜ193 | 207 | 0.10%, N,N-dimethyl aminopropylamine monolaurate. |

ª Hydroxyethylated cornstarch.
ᵇ Hypochlorite oxidized cornstarch.
ᶜ Enzyme converted tapioca starch.

EXAMPLE V

Still another composition of my invention is formulated as follows:

| | Parts by wt., dry basis |
|---|---|
| Kaolin clay | 300 |
| Starch | 36 |
| Butadiene-styrene latex | 18 |
| Water | 280 |
| Calcium stearate | 1.5 |

To the above add 3.0 parts by weight of a 10% aqueous gel of diethylenetriamine monostearate.

EXAMPLE VI

Another composition of the invention is as follows:

| | Parts by wt., dry basis |
|---|---|
| Kaolin clay | 300 |
| Starch | 30 |
| Casein | 2 |
| Butadiene-styrene latex | 15 |
| Water | 350 |

To the above add 4.0 parts by weight of a 10% aqueous solution of diethylenetriamine monolaurate.

While I have described certain methods of practicing my invention, it is to be distinctly understood that the invention is not limited thereto but may otherwise be variously practiced within the scope of the following claims.

I claim:

1. A composition for coating paper comprising an amylaceous adhesive, kaolin clay, and from about 0.025 percent to about 5.0 percent, based on the weight of said clay, of a fatty acid which had previously been saponified with alkylene polyamine having the general formula:

$$\begin{array}{c} R_3 \\ | \\ N-(R_1NH)_nR_2NH_2 \\ | \\ R_4 \end{array}$$

wherein $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8, said fatty acid containing from 12 to 18 carbon atoms and being employed in amount sufficient to react with at least one of the amine groups of said alkylene polyamine.

2. A fluid composition for coating paper comprising water, an amylaceous adhesive, kaolin clay, and from about 0.025 to about 5.0 percent, based on the weight of said clay, of a fatty acid having from 12 to 18 carbon atoms which had previously been saponified with an alkylene polyamine having the general formula:

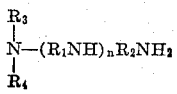

wherein $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8, said fatty acid being employed in amount within the range of from 1 mol per mol of said alkylene polyamine to an amount sufficient to react with all of the amine groups present in said alkylene polyamine.

3. A fluid composition for coating paper comprising water, an amylaceous adhesive, kaolin clay, and from about 0.025 to about 5.0 percent, based on the weight of said clay, of a fatty acid which had been saponified with an ethylene amine, said amine having the general formula:

$$NH_2(CH_2CH_2NH)_nCH_2CH_2NH_2$$

wherein $n$ is an integer from 0 to 3, and said fatty acid having from 12 to 18 carbon atoms and being employed in amount within the range of from 1 mol per mol of said ethylene amine to an amount sufficient to react with all of the amine groups of said ethylene amine.

4. A fluid composition for coating paper comprising water, a starch adhesive, a pigment-forming quantity of kaolin clay, and from about 0.025 to about 5.0 percent, based on the weight of said clay, of stearic acid which had previously been saponified with an ethylene amine having the general formula:

$$NH_2(CH_2CH_2NH)_nCH_2CH_2NH_2$$

wherein $n$ is an integer from 0 to 3, said stearic acid being employed in amount within the range of from 1 mol per mol of said ethylene amine to an amount sufficient to react with all of the amine groups of said ethylene amine.

5. A fluid composition for coating paper comprising water, an amylaceous adhesive, a pigment-forming quantity of kaolin clay, and from about 0.025 to 5.0 percent, based on the weight of said clay, of a polyalkylene polyamine soap of the general formula:

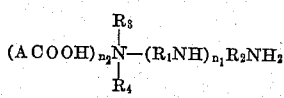

wherein $R_1$ and $R_2$ are alkylene groups having from 2 to 3 carbon atoms, $R_3$ and $R_4$ are selected from the group consisting of hydrogen and alkyl groups having from 1 to 2 carbon atoms, A is selected from the group consisting of alkyl and alkenyl groups having from 11 to 17 carbon atoms, $n_1$ is an integer from 0 to 8, and $n_2$ is a number having a value of at least 1 and not to exceed the value of $n_2$, whereby at least two amine groups of said polyalkylene polyamine soap are unneutralized, said soap having been formed prior to its incorporation in said composition.

6. A fluid composition for coating paper comprising water, a hypochlorite oxidized cornstarch adhesive, a pigment-forming quantity of kaolin clay, and from about 0.1 to about 1.0 percent, based on the weight of said clay, of a monofatty acid salt of diethylenetriamine which had been formed prior to the incorporation of said diethylenetriamine in said composition, said fatty acid containing from 12 to 18 carbon atoms.

7. A composition for coating paper comprising water, a hypochlorite oxidized cornstarch adhesive, a pigment-forming quantity of kaolin clay, and from 0.1 to 1.0 percent, based on the weight of said clay, of diethylenetriamine monostearate which had been formed prior to its incorporation in said composition.

8. In the preparation of an aqueous kaolin clay coating color containing an amylaceous adhesive, the improvement comprising incorporating therein from about 0.025 to 5.0 percent, based on the weight of said clay, of a fatty acid which had been saponified with an alkylene polyamine of the general formula:

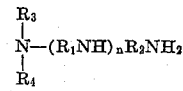

wherein $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8, said fatty acid containing from 12 to 18 carbon atoms and being employed in amount within the range of from 1 mol per mol of said alkylene polyamine to an amount sufficient to react with all of the amine groups present in said alkylene polyamine.

9. In the preparation of an aqueous kaolin clay coating color containing an amylaceous adhesive, the improvement comprising incorporating therein from about 0.1 to about 1.0 percent, based on the weight of said clay, of diethylenetriamine monostearate which had been formed prior to its incorporation in said coating color.

10. A method of preparing a coating color which comprises dispersing kaolin clay in an aqueous amylaceous adhesive solution and incorporating therein from about 0.025 to 5.0 percent, based on the weight of said clay, of a fatty acid which had previously been saponified with an alkylene polyamine having the following general formula:

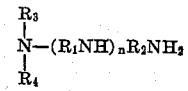

wherein $R_1$ and $R_2$ are alkylene groups having from 2 to 3 carbon atoms, $R_3$ and $R_4$ are selected from the group consisting of hydrogen and alkyl groups having from 1 to 2 carbon atoms, and $n$ is an integer from 0 to 8, said fatty acid containing from 12 to 18 carbon atoms and being employed in amount within the range of from 1 mol per mol of said alkylene polyamine to an amount sufficient to react with all of the amine groups of said alkylene polyamine.

11. A method of preparing a coating color which comprises dispersing kaolin clay in an aqueous solution of hypochlorite oxidized cornstarch and incorporating therein from about 0.1 to 1.0 percent, based on the weight of said clay, of an ethylene amine soap, said ethylene amine having the following general formula:

$$NH_2(CH_2CH_2NH)_nCH_2CH_2NH_2$$

wherein $n$ is an integer from 0 to 3, and said soap having been formed prior to its incorporation in said adhesive solution by saponification of from 1 to 3 mols of a fatty acid having 12 to 18 carbon atoms with 1 mol of said ethylene amine.

References Cited in the file of this patent

UNITED STATES PATENTS

| | | |
|---|---|---|
| 2,394,233 | Craig | Feb. 5, 1946 |
| 2,526,598 | Barrett | Oct. 17, 1950 |
| 2,852,406 | Riegler | Sept. 16, 1958 |
| 2,885,374 | Sweeney | May 5, 1959 |

UNITED STATES PATENT OFFICE
CERTIFICATE OF CORRECTION

Patent No. 3,066,035

November 27, 1962

Charles G. Albert

It is hereby certified that error appears in the above numbered patent requiring correction and that the said Letters Patent should read as corrected below.

Column 3, line 30, for "clay" read -- lay --; column 8, line 61, for "clap" read -- clay --.

Signed and sealed this 14th day of May 1963.

(SEAL)
Attest:

ERNEST W. SWIDER
Attesting Officer

DAVID L. LADD
Commissioner of Patents